United States Patent Office 2,788,366
Patented Apr. 9, 1957

2,788,366

PREPARATION OF TEREPHTHALIC ACID

Rudolf Lotz, Klingenberg (Main), Germany, assignor to Vereinigte Glanzstoff-Fabriken A. G., Wuppertal-Elberfeld, Germany No Drawing. Application January 26, 1953, Serial No. 333,340

Claims priority, application Germany January 30, 1952

4 Claims. (Cl. 260—523)

This invention relates to the preparation of terephthalic acid.

It is an object of this invention to provide a method of preparing terephthalic acid which does not require working under elevated pressure.

It is another object of the invention to provide a method of producing terephthalic acid with good yields.

A further object of the present invention is to provide a continuous process for making terephthalic acid.

Still another object of this invention is to provide a method which permits obtaining terephthalic acid from benzene by two process steps only.

Other objects and the manner in which the same are attained, will become apparent as this specification proceeds.

In the prior art, it has been proposed to prepare terephthalic acid from p-dialkyl benzenes, such as p-xylene and p-cymene, for example, by treating the same at temperatures from 150 to 210° C., and at a pressure of about 14 atmospheres, with nitric acid of a concentration of 30%. While this process results in good yields, it involves the very material disadvantage of requiring working under pressure, inasmuch as the alkyl groups can not be converted into carboxy groups at other than materially elevated pressure.

The invention contemplates eliminating the disadvantageous requirement for operation under elevated pressure, of the prior art method, in that it involves preparation of terephthalic acid from p-xylylene dichloride, at ordinary pressure.

In accordance with the basic concept of the invention, I have discovered that if p-xylylene dichloride is treated at temperatures above the melting point of p-xylylene dichloride, and preferably at temperatures from about 110 to about 120° C., and at ordinary pressure, with nitric acid of medium concentration, and preferably a concentration from about 20 to about 40%, the p-xylylene dichloride is converted after about 2 hours, into terephthalic acid, a yield of about 90% being obtained. It was indeed surprising to find that terephthalic acid can be obtained at such a yield by using nitric acid of such relatively low concentration, in the absence of elevated pressure.

If yields exceeding 90% are desired, the invention contemplates a modification of the method outlined above wherein the reaction proceeds in two stages, i. e. the small quantity of intermediate oxidation products formed in a first batch are returned to a second batch for completion of the conversion thereof.

The reaction proceeds in a manner such that in the beginning, the p-xylylene dichloride dissolves completely in the nitric acid. After the lapse of about 2 hours a solid reaction product separates out which no longer contains any starting material. It is removed by filtration. This raw product is cleaned by treatment e. g. with carbon tetrachloride, and completely purified by either recrystallization from hot alcohol, or sublimation.

Alternatively, the raw terephthalic acid product can be converted by esterification with a large excess of methanol and in the presence of concentrated sulfuric acid, into the terephthalic acid methylester which may serve as an intermediate product to be worked up as such, or else may be saponified to yield terephthalic acid.

Inasmuch as the p-xylylene dichloride serving as the starting product for the present process, is obtained from benzene in a single stage operation, and the method according to this invention obtains terephthalic acid from p-xylylene dichloride also in a single step, at least as far as yields up to 90% are concerned, the invention results in providing a process whereby to obtain terephthalic acid from benzene in two steps only, a distinct advantage over the existing method compelling the use of xylene as the starting material.

The invention will be more fully described by reference to the following specific example. It should be understood, however, that the example is given by way of illustration only, and that the invention is not to be limited by the details set forth therein.

*Example*

70 grams of p-xylylene dichloride are reacted with 700 grams of nitric acid of a concentration of 20%, by heating with stirring and reflux to 115° C. and maintaining this temperature for 2 hours. In the beginning, the p-xylylene dichloride dissolves; after 2 hours, the oxidation products separate out in solid form. After slow cooling and filtration, the raw product is treated with carbon tetrachloride which dissolves any by-products whereas terephthalic acid is obtained in solid form. For purposes of ultimate purification, the terephthalic acid can be treated further by sublimation or recrystallization from hot alcohol. The yield of raw product is 68 grams, and of pure terephthalic acid, 61 grams.

Manifold advantages attach to the invention. The fact that the present method of preparing terephthalic acid does away with the requirement of elevated pressure imposed by the prior art process, leads to a material simplification of the equipment used in carrying out the present method, and to a significant improvement of the economy of the process. It is of particular importance that the method lends itself to continuous operation, and that it permits obtaining terephthalic acid directly from benzene in a two stage procedure. Finally, extremely high yields are obtainable according to the present method, by so simple an expedient as returning the small quantities of oxidation products to the reaction zone for completion of the conversion.

While I have disclosed the preferred embodiment of my invention and the preferred mode of carrying it into effect, it will be readily apparent to those skilled in the art that the invention as illustrated in the foregoing specification, is susceptible to numerous variations without departure from the spirit of the invention or sacrifice of the advantages thereof. Accordingly, the scope of the invention is to be understood as limited solely by the appended claims.

I claim:

1. The method of preparing terephthalic acid which comprises treating p-xylylene dichloride at a temperature above the melting point of p-xylylene dichloride and at ordinary pressure, with nitric acid of a concentration of about 20%.

2. The method of preparing terephthalic acid, which comprises treating p-xylylene dichloride at a temperature from about 110 to about 120° C. and at ordinary pressure, with nitric acid of a concentration of about 20%.

3. The method of preparing terephthalic acid at a yield above 90%, which comprises treating p-xylylene dichloride at a temperature from about 110 to about 120° C. and at ordinary pressure, with nitric acid of a concentration of about 20%, for about 2 hours, and returning the oxidation products separating out in solid form, to the reaction zone for repetition of the treatment.

4. The method of preparing terephthalic acid which comprises treating a first fresh batch of p-xylylene dichloride with nitric acid of a concentration of about 20%, at a temperature above the melting point of the p-xylylene dichloride and at ordinary pressure, separating the intermediate oxidation products thus formed, and then adding these products to a second fresh batch of p-xylylene dichloride which is similarly treated with nitric acid, to obtain yields of terephthalic acid greater than 90%.

References Cited in the file of this patent

UNITED STATES PATENTS

| | | |
|---|---|---|
| 939,940 | Barstow | Nov. 9, 1909 |
| 1,332,028 | Coblentz et al. | Feb. 24, 1920 |
| 1,488,730 | Beall et al. | Apr. 1, 1924 |
| 2,563,820 | Darragh et al. | Aug. 14, 1951 |
| 2,666,786 | Kulka et al. | Jan. 19, 1954 |

FOREIGN PATENTS

| | | |
|---|---|---|
| 644,707 | Great Britain | Oct. 18, 1950 |
| 655,074 | Great Britain | July 11, 1951 |

OTHER REFERENCES

Baeyer: Liebigs Ann., vol. 245, pp. 138–9 (1888)